United States Patent
Kuji et al.

(10) Patent No.: US 7,095,360 B2
(45) Date of Patent: Aug. 22, 2006

(54) SECONDARY SURVEILLANCE RADAR SYSTEM, GROUND EQUIPMENT FOR USE THEREIN, AND RESPONSE SIGNAL CHECKING METHOD APPLIED THERETO

(75) Inventors: Yoshinori Kuji, Yokohama (JP); Yoshirou Aoki, Yokohama (JP); Hisashi Ootomo, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 127 days.

(21) Appl. No.: 10/933,210

(22) Filed: Sep. 3, 2004

(65) Prior Publication Data
US 2005/0083226 A1 Apr. 21, 2005

(30) Foreign Application Priority Data
Sep. 5, 2003 (JP) .............................. 2003-314331

(51) Int. Cl.
*G01S 13/74* (2006.01)
(52) U.S. Cl. .............................. 342/29; 342/30; 342/32; 342/37; 342/40
(58) Field of Classification Search ............ 342/29–40, 342/42–50
See application file for complete search history.

(56) References Cited

U.S. PATENT DOCUMENTS

| | | | |
|---|---|---|---|
| 5,636,123 A * | 6/1997 | Rich et al. ............ | 701/207 |
| 5,825,322 A * | 10/1998 | Capozoli ............ | 342/37 |
| 6,222,480 B1 * | 4/2001 | Kuntman et al. ....... | 342/30 |
| 6,313,783 B1 * | 11/2001 | Kuntman et al. ....... | 342/32 |
| 6,433,729 B1 * | 8/2002 | Staggs .................. | 342/29 |
| 6,683,541 B1 * | 1/2004 | Staggs et al. .......... | 340/961 |
| 2002/0063653 A1 * | 5/2002 | Oey et al. ............. | 342/29 |
| 2002/0089432 A1 * | 7/2002 | Staggs et al. .......... | 340/945 |
| 2002/0188398 A1 * | 12/2002 | Watson .................. | 701/120 |
| 2005/0083226 A1 * | 4/2005 | Kuji et al. ............ | 342/29 |
| 2006/0055586 A1 * | 3/2006 | Kuji et al. ............ | 342/32 |

FOREIGN PATENT DOCUMENTS

| | | |
|---|---|---|
| EP | 0 431 449 A2 | 6/1991 |
| JP | 2005083815 A * | 3/2005 |

OTHER PUBLICATIONS

"Mode S system design and architecture", Baker, J.L.; Orlando, V.A.; Link, W.B.; Collins, W.G. Proceedings of the IEEE vol. 77, Issue 11, Nov. 1989 pp. 1684-1694.*

"Development and operation of the Traffic Alert and Collision Avoidance System (TCAS)", Williamson, T.; Spencer, N.A. Proceedings of the IEEE vol. 77, Issue 11, Nov. 1989 pp. 1735-1744.*

(Continued)

*Primary Examiner*—John B. Sotomayor
(74) *Attorney, Agent, or Firm*—Oblon, Spivak, McClelland, Maier & Neustadt, P.C.

(57) ABSTRACT

A secondary surveillance radar system for use in surveillance of an airspace, which reliably achieves surveillance of the airspace even when an aircraft including a mode S transponder and an aircraft including an ATCRBS transponder are both located in the airspace, wherein both of a time interval between time when transmission of an all-call interrogation signal specific for mode S is completed and time when the transmission of an all-call interrogation signal specific for mode A is started and a time interval between time when transmission of the all-call interrogation signal specific for mode S is completed and time when transmission of an all-call interrogation signal specific for mode C is started is varied in units of one all-call time period.

16 Claims, 7 Drawing Sheets

OTHER PUBLICATIONS

"A technical assessment of ADS-B and multilateration technology in the Gulf of Mexico", Daskalakis, A.; Martone, P. Radar Conference, 2003. Proceedings of the 2003 IEEE May 5-8, 2003 pp. 370-378.*

T. Yoshida, et al., "Rader Engineering Revised Edition", Institute of Electronics, Information and Communication Engineers, 1996, pp. 227-233.

M. C. Stevens, British Library Cataloguing In Publication Data, ISBN 0-89006-292-7, pp. 264-267, "Secondary Surveillance Radar", 1988.

"European Mode S Station Functional Specification", European Organization for the Safety of Air Navigation, XP-002307400, Apr. 19, 2001, pp. 53-69.

R. M. Trim, OBE, "Mode S: an Introduction and Overview", Electronics & Communication Engineering Journal, vol. 2, No. 2, XP-000114489, Apr. 1, 1990, pp. 53-59.

Steven M. C., "Secondary Surveillance Radar, Secondary Surveillance Radar", XP-002154909, 1988, pp. 168-171, 250-274.

* cited by examiner

SECONDARY SURVEILLANCE RADAR SYSTEM, GROUND EQUIPMENT FOR USE THEREIN, AND RESPONSE SIGNAL CHECKING METHOD APPLIED THERETO

CROSS-REFERENCE TO RELATED APPLICATIONS

This application is based upon and claims the benefit of priority from prior Japanese Patent Application No. 2003-314331, filed Sep. 5, 2003, the entire contents of which are incorporated herein by reference.

BACKGROUND OF THE INVENTION

1. Field of the Invention

The present invention relates to a secondary surveillance radar system and a ground equipment for use therein. Also, the present invention relates to improvement of a method for determining validity/invalidity of reply signals returned from an airborne equipment in reply to interrogation signals transmitted from the ground equipment, the method being applied to the ground equipment. The airborne equipment is an equipment mounted in an aircraft, such as a mode S transponder or an ATCRBS (Air Traffic Control Radar Beacon System) transponder.

2. Description of the Related Art

A secondary surveillance radar (SSR) system comprises a ground equipment for transmitting interrogation signals to an aircraft and an airborne equipment for returning reply signals in reply to the interrogation signals. It should be noted that a related technique is disclosed on pages 227–233 of "Radar Engineering Revised Edition" written by Takashi Yoshida, and published by the Institute of Electronics, Information and Communication Engineers (1996). This literature discloses a secondary surveillance radar in detail.

Conventionally, an ATCRBS (Air Traffic Control Radar Beacon System) transponder is used as the airborne equipment. In addition, in recent years, the number of aircrafts including mode S transponders has been increased. A mode S transponder has a function of incorporating various information into reply signals. By virtue of this function, the mode S transponder can transmit a larger number of information to the ground equipment.

The method of transmitting interrogation signals is variously designed in order that the ground equipment could acquire both the ATCRBS transponder and the mode S transponder.

In the SSR system, the time period for which interrogation signals are transmitted is divided into all-call time periods and roll-call time periods in units of one sweep time period of a radar. The all-call time period is a time period for acquiring the mode S transponder and the ATCRBS transponder. The roll-call time period is a time period in which an individual interrogation is sent to the mode S transponder, and a reply to the interrogation is returned from the mode S transponder. In a control zone, a number of aircrafts can be acquired with respective antenna main beams. Therefore, it is important how the all-call time periods and the roll-call time periods are set.

In a conventional secondary surveillance radar system, an all-call interrogation specific for mode S (mode S only all call) and an all-call interrogation specific for mode A (mode A only all call)(or an all-call interrogation specific for mode C (mode C only all call)) are transmitted in the same all-call time period such that the time interval between the time when the all-call interrogation specific for mode S is transmitted and the time when the all-call interrogation specific for mode A (or all-call interrogation specific for mode C) is transmitted is fixed. In this case, the above fixed time interval corresponds to the time interval between a sync phase reversal during an all call specific for mode S and a pulse P3 during an all call specific for mode A (or an all call specific for mode C).

Thus, if side lobe suppression using a pulse P2 fails, that is, all-call interrogations specific for mode S cannot be suppressed, there is a case where reply signals which should not be returned are returned from the ATCRBS transponder. That is, the ATCRBS transponder recognizes the sync phase reversal of P6 pulse as a P3 pulse. They interfere with surveillance of the airspace. Thus, this problem is required to be solved.

In such a manner, in the conventional secondary surveillance radar system, there is a case where invalid responses to all calls specific for mode S are returned from the ATCRBS transponder. In this case, in the ground equipment, in one sweep time period, invalid responses and valid responses are mixed, or only invalid responses can be obtained. The invalid responses interfere with surveillance of the airspace. They thus need to be avoided by some measure.

BRIEF SUMMARY OF THE INVENTION

According to an aspect of the present invention, there is provided a secondary surveillance radar system for use in surveillance of an airspace, which reliably achieves surveillance of the airspace even when an aircraft including a mode S transponder and an aircraft including an ATCRBS transponder are both located in the airspace, wherein both of a time interval between time when transmission of an all-call interrogation signal specific for mode S is completed and time when the transmission of an all-call interrogation signal specific for mode A is started and a time interval between time when transmission of the all-call interrogation signal specific for mode S is completed and time when transmission of an all-call interrogation signal specific for mode C is started is varied in units of one all-call time period.

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
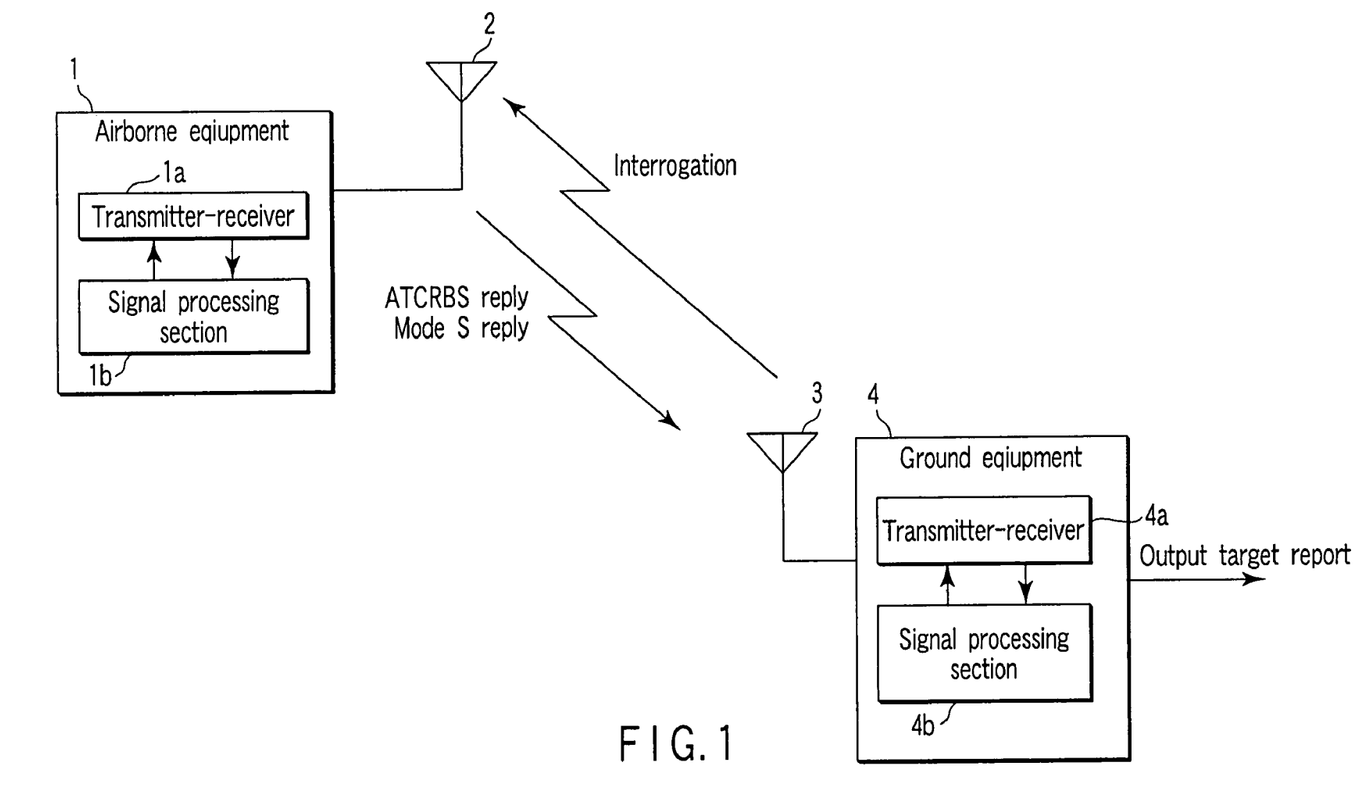
FIG. 1 is a view showing an embodiment of a secondary surveillance radar system according to the present invention.

FIG. 1 is a view showing an embodiment of a secondary surveillance radar system according to the present invention. The secondary surveillance radar system comprises an airborne equipment 1 and a ground equipment 4. The airborne equipment 1 is a mode S transponder or an ATCRBS (Air Traffic Control Radar Beacon System) transponder, and is mounted in an aircraft. The ground equipment 4 is provided on the ground, and acquires the aircraft. This embodiment is directed to a case where an aircraft including a mode S transponder and an aircraft including an ATCRBS transponder are both present in an airspace under surveillance of the ground equipment 1.

The ground equipment 4 comprises a transmitter-receiver 4a and a signal processing section 4b. The transmitter-receiver 4a transmits a interrogation signal into the airspace under surveillance of the ground equipment 1, and receives a reply signal from each aircrafts, through an antenna 3. The signal processing section 4b generates the interrogation signal, and also generates a target report of the aircraft from the reply signal. The interrogation signal contains an all-call interrogation signal specific for mode S and an all-call interrogation signal specific for mode A, or contains an all-call interrogation signal specific for mode S and an all-call interrogation signal specific for mode C.

The airborne equipment 1 comprises a transmitter-receiver 1a and a signal processing section 1b. The transmitter-receiver 1a receives interrogation signals, and then returns reply signals. The reply signals are generated by the signal processing section 1b in reply to the received interrogation signals.

Figure 2:
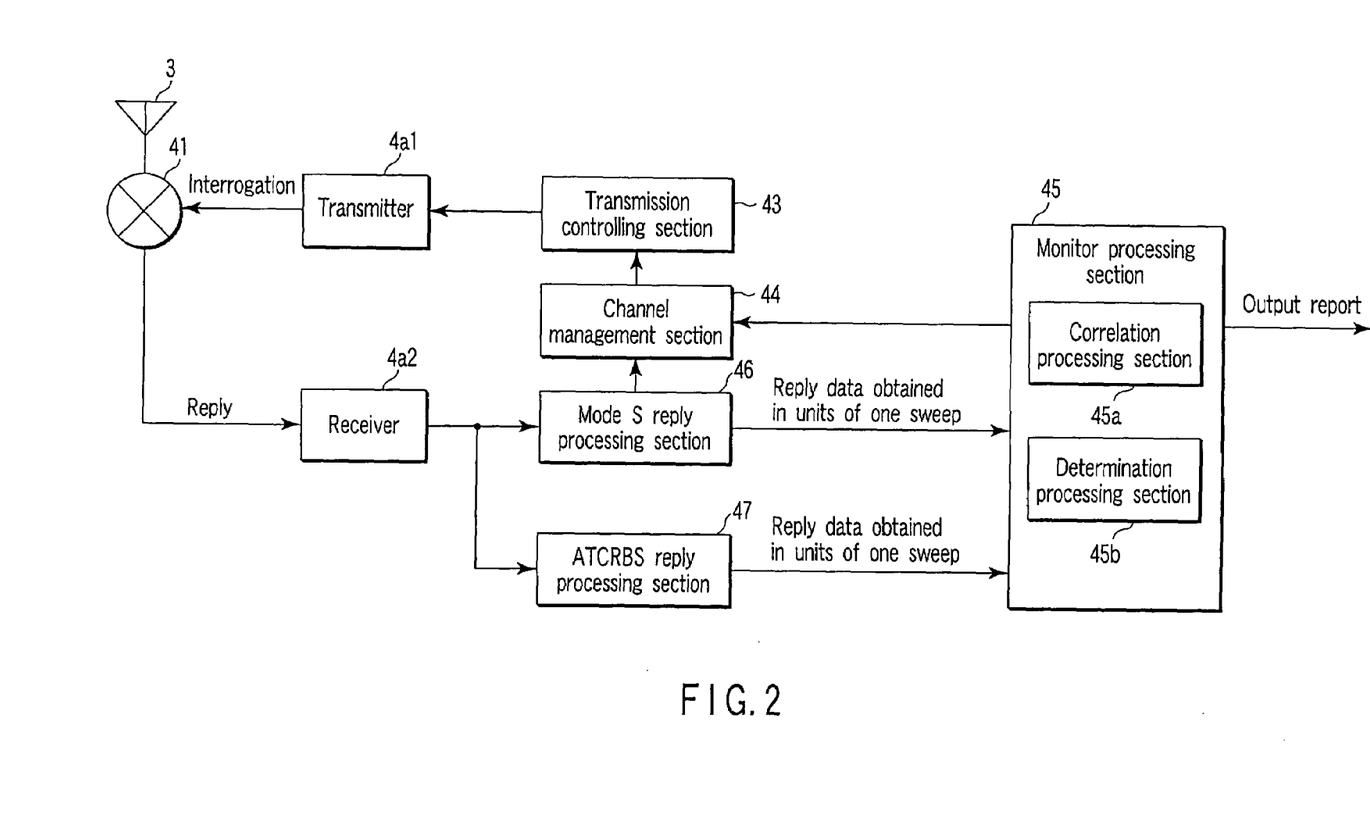
FIG. 2 is a block diagram showing the function of a ground equipment shown in FIG. 1 in more detail.

FIG. 2 is a block diagram showing the function of the ground equipment 4 shown in FIG. 1 in more detail. Referring to FIG. 2, a transmission controlling section 43 generates interrogation signals. The interrogation signals are input to a transmitter 4a1, and are then transmitted to the above airspace via a circulator 41 and the antenna 3. At this time, the transmission controlling section 43 varies the transmission timings of the interrogation signals by controlling the transmitter 4a1 such that the transmission timings of the interrogations signals are different from each other.

Response signals are input to a receiver 4a2 through the antenna 3 and the circulator 41, and are received and demodulated. The received and demodulated reply signals are input to either a mode S reply processing section 46 or an ATCRBS reply processing section 47 in accordance with their received timeslot. Thereby, from the reply signals, reply data is generated in units of one sweep. The reply data is given to a monitor processing section 45. The monitor processing section 45 controls a channel management section 44 to control the interrogation signals generated by the transmission controlling section 43.

The transmission controlling section 43 randomly varies the time interval between the time when transmission of the all-call interrogation signal for mode S is completed and the time when transmission of the all-call interrogation signal for mode A is started. Similarly, the transmission controlling section 43 randomly varies the time interval between the time when transmission of the all-call interrogation signal for mode S is completed and the time when transmission of the all-call interrogation signal for mode C is started.

To be more specific, the time interval between a mode S processing reference time point (sync phase reversal) of the all-call interrogation signal for mode S and a P3 pulse of the all-call interrogation signal for mode A is randomly varied. Similarly, the time interval between a mode S processing reference time point (sync phase reversal) of the all-call interrogation signal for mode S and a P3 pulse of the all-call interrogation signal for mode C is randomly varied. It is preferable that the above time interval be set to be longer than a dead time of the ATCRBS transponder. The dead time corresponds to a time period between the time when the transponder receives a interrogation signal and the time when the transponder becomes ready to receive a subsequent interrogation signal.

The monitor processing section 45 comprises a correlation processing section 45a and a determination processing section 45b. The correlation processing 45a obtains a number of mode S reply data in respective sweep time periods, and carries out correlation processing by using the mode S reply data, while following a known procedure. Based on the result of the correlation processing, the correlation processing 45a specifies mode S reply signals transmitted from an aircraft including the above airborne equipment 1.

Furthermore, the correlation processing section 45a acquires mode A reply data and mode C reply data in a number of sweep time periods, and performs known correlation processing on the mode A reply data or mode C reply data. Based on the result of the correlation processing, the correlation processing section 45a specifies mode A reply signals or mode C reply signals which are transmitted from the above aircraft.

The determination processing section 45b acquires range data in units of one sweep from specified mode S reply signals with respect to each of aircrafts. The determination processing section 45b determines whether the mode S reply signals are valid or invalid based on the variance between a number of range data each obtained in units of one sweep. The monitor processing section 45 monitors each aircraft based on mode A reply signals, mode C reply signals, and the mode S reply signals which are determined to be valid by the determination processing section 45b, and then outputs a target report.

Figure 3:
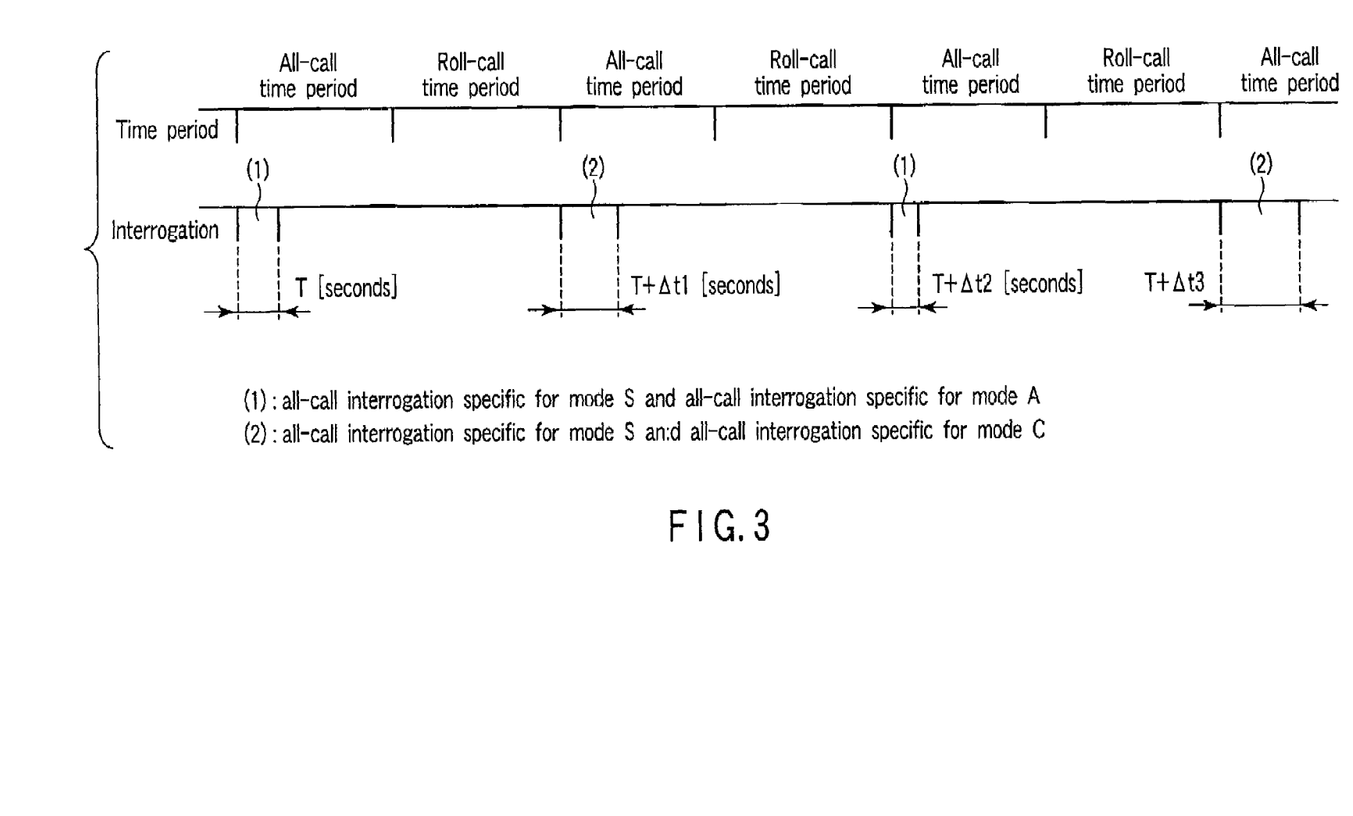
FIG. 3 is a diagrammatic view showing intervals at which all-call interrogation signals specific for mode S and all-call interrogation signals specific for mode A (or all-call interrogation signals for mode C) are transmitted, in the above embodiment of the present invention.

FIG. 3 is a diagrammatic view showing intervals at which all-call interrogation signals specific for mode S and all-call interrogation signals specific for mode A (all-call interrogation signals for mode C) are transmitted, in the above embodiment of the present invention. Those intervals are set by the transmission controlling section 43 which is shown in FIG. 2. As shown in FIG. 3, in the transmitting time of interrogation signals, all-call time periods and roll call time periods are alternately provided. Each of all-call interrogation signals specific for mode S and all-call interrogation signals specific for mode A (all-call interrogation signals specific for mode C) is transmitted in an all-call time period.

When an all-call time period starts, first, an all-call interrogation signal for mode S is transmitted. In the embodiment, the time interval between the sync phase reversal of the all-call interrogation signal for mode S and the P3 pulse of the all-call interrogation signal for mode A is randomly varied with respect to each of the all-call time periods. Similarly, the time interval between the sync phase reversal of the all-call interrogation signal for mode S and the P3 pulse of the all-call interrogation signal for mode C is randomly varied with respect to each of the all-call time periods.

Referring to FIG. 3, in the time period indicated by reference numeral (1), an all-call interrogation signal for mode S and an all-call interrogation signal for mode A are transmitted. In the time period indicated by reference numeral (2), an all-call interrogation signal for mode S and an all-call interrogation signal for mode C are transmitted. The time period (1) is T seconds or T+Δt2 seconds as shown in FIG. 3. The time period (2) is T+Δt1 seconds or T+Δt3 seconds as shown in FIG. 3. In the embodiment, Δt1, Δt2 and Δt3 are all randomly variable.

Figure 4:
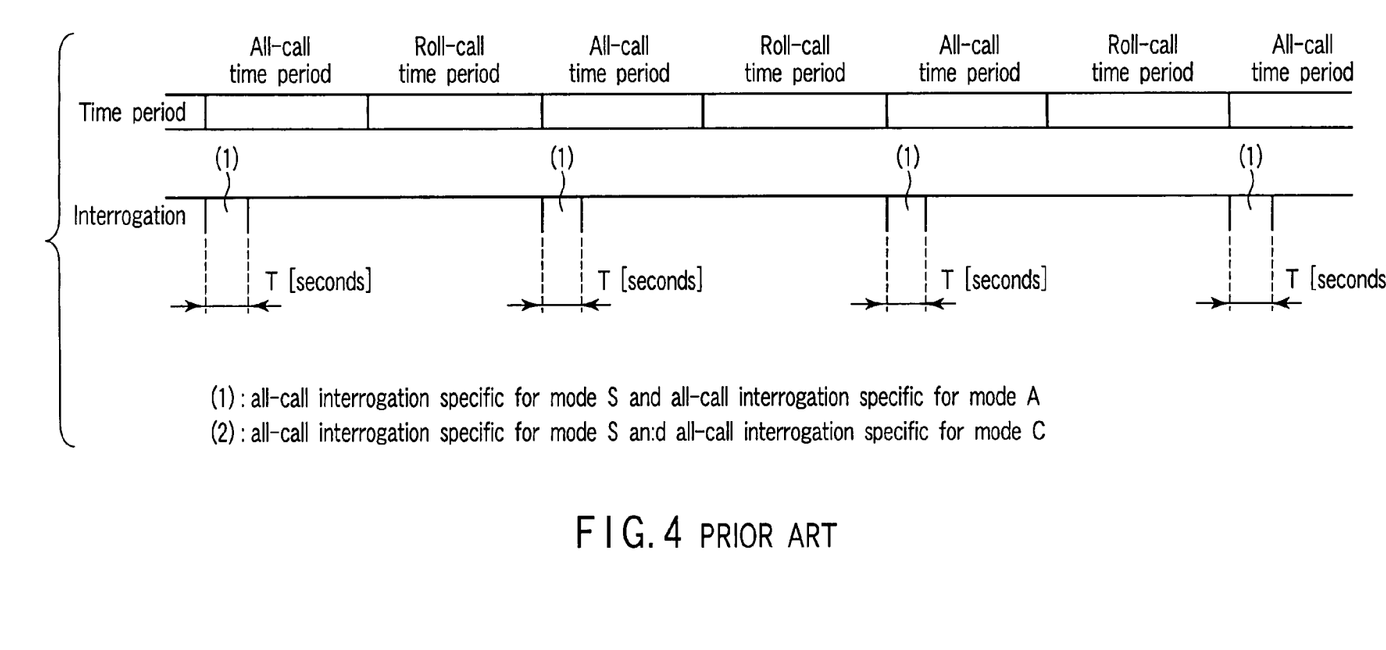
FIG. 4 is a diagrammatic view which shows intervals at which all-call interrogation signals specific for mode S and all-call interrogation signals specific for mode A (or all-call interrogation signals for mode C) are transmitted in a conventional secondary surveillance radar system, in comparison with those in the secondary surveillance radar system according to the embodiment of the present invention.

FIG. 4 is a diagrammatic view showing intervals at which all-call interrogation signals specific for mode S and all-call interrogation signals specific for mode A (or all-call interrogation signals for mode C) are transmitted, in the conventional secondary surveillance radar system, in comparison with those in the secondary surveillance radar system according to the embodiment of the present invention. As shown in FIG. 4, in the conventional secondary surveillance radar system, the time interval between the synchronous phase inverse point of the all-call interrogation signal specific for mode S and the P3 pulse of the all-call interrogation signal specific for mode A (or all-call interrogation signal specific for mode C) is a constant value T.

Figure 5:
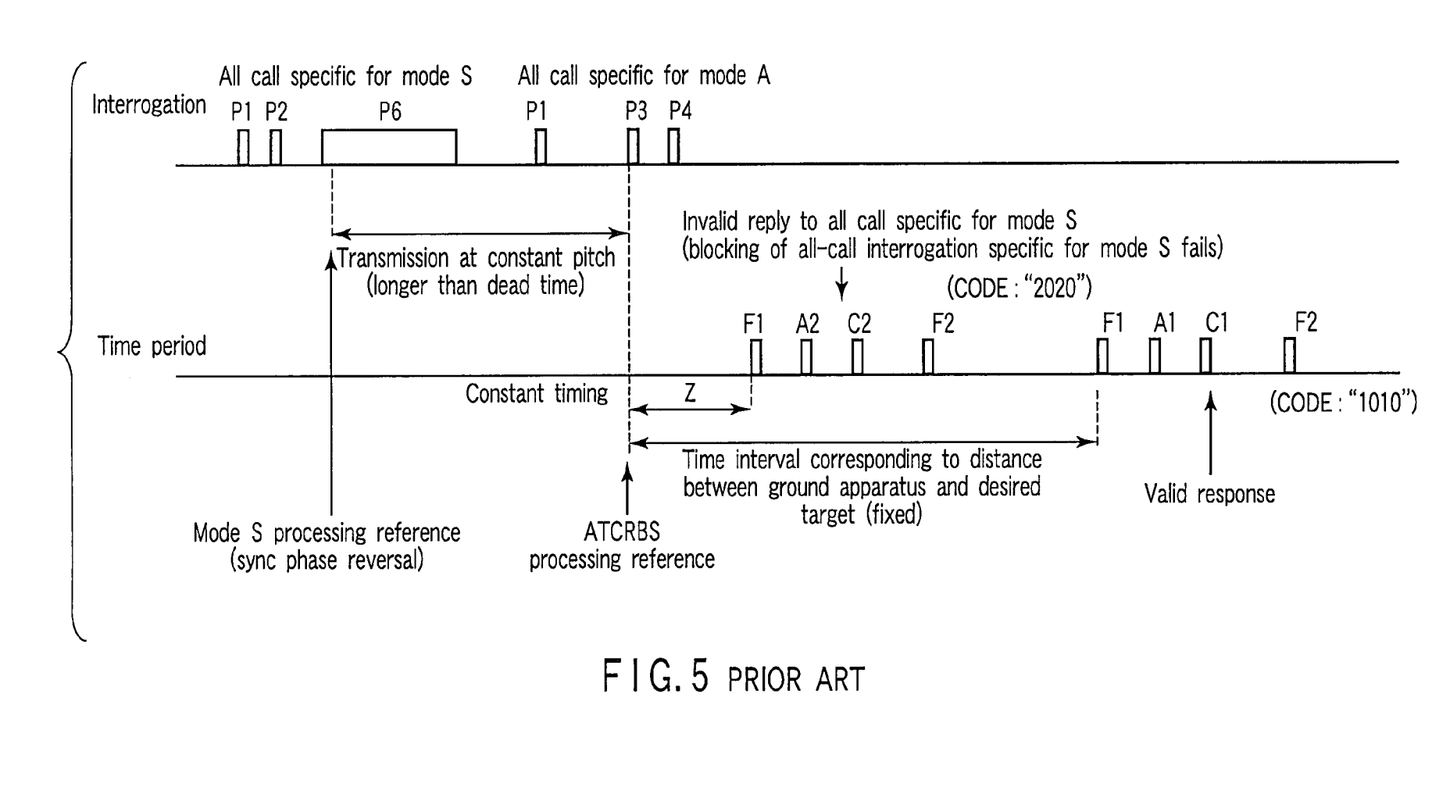
FIG. 5 is a timing chart which diagrammatically shows a situation occurring in the conventional secondary surveillance radar system, in comparison with that according to the embodiment of the present invention.

FIG. 5 is a timing chart diagrammatically showing a situation occurring in the conventional secondary surveillance radar system, in comparison with that according to the embodiment of the present invention. As shown in FIG. 5, an all call for mode S contains pulses P1, P2 and P6. In the pulse P6, a sync phase reversal is set as a mode S processing reference. On the other hand, an all call for mode A (and all call for mode C) contains pulses P1, P3 and P4. The pulse P3 is a start reference time point of processing to be performed by the ATCRBS transponder.

In the conventional secondary surveillance radar system, the time interval between the sync phase reversal of the pulse P6 and the pulse P3 is not varied in units of one all-call time period, i.e., the above time intervals in the all-call time periods are equal to each other. Thus, if an all-call interrogation for mode S is not suppressed by a pulse P2, and an invalid reply (abnormal reply)to an all call specific for mode S is returned from the ATCRBS transponder, the invalid reply is detected in a given slant range (denoted by "Z" in FIG. 5) as a reply to an all-call interrogation for mode A (or an all-call interrogation for mode C). Therefore, a correlation calculation processing system cannot recognize the above reply as an invalid reply (abnormal reply), and processes it as a valid reply (normal reply). That is, although the number of desired targets is one, the correlation calculation processing system mistakenly recognizes that a number of different targets are present.

Figure 6:
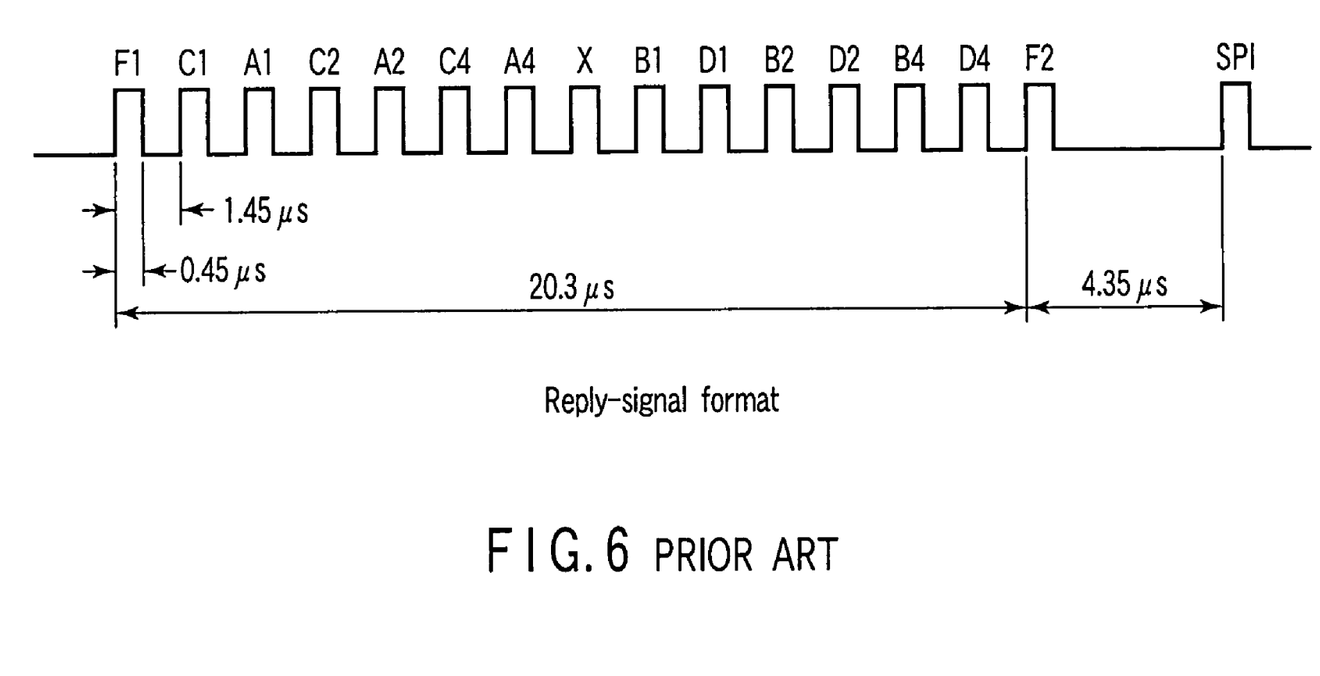
FIG. 6 is a view showing the format of a reply signal. The format is determined according to international standard, and is thus used in common by the prior art and the present invention.

FIG. 6 is a view showing the format of a reply signal. The format is determined according to international standard, and is thus used in common by the prior art and the present invention.

Figure 7:
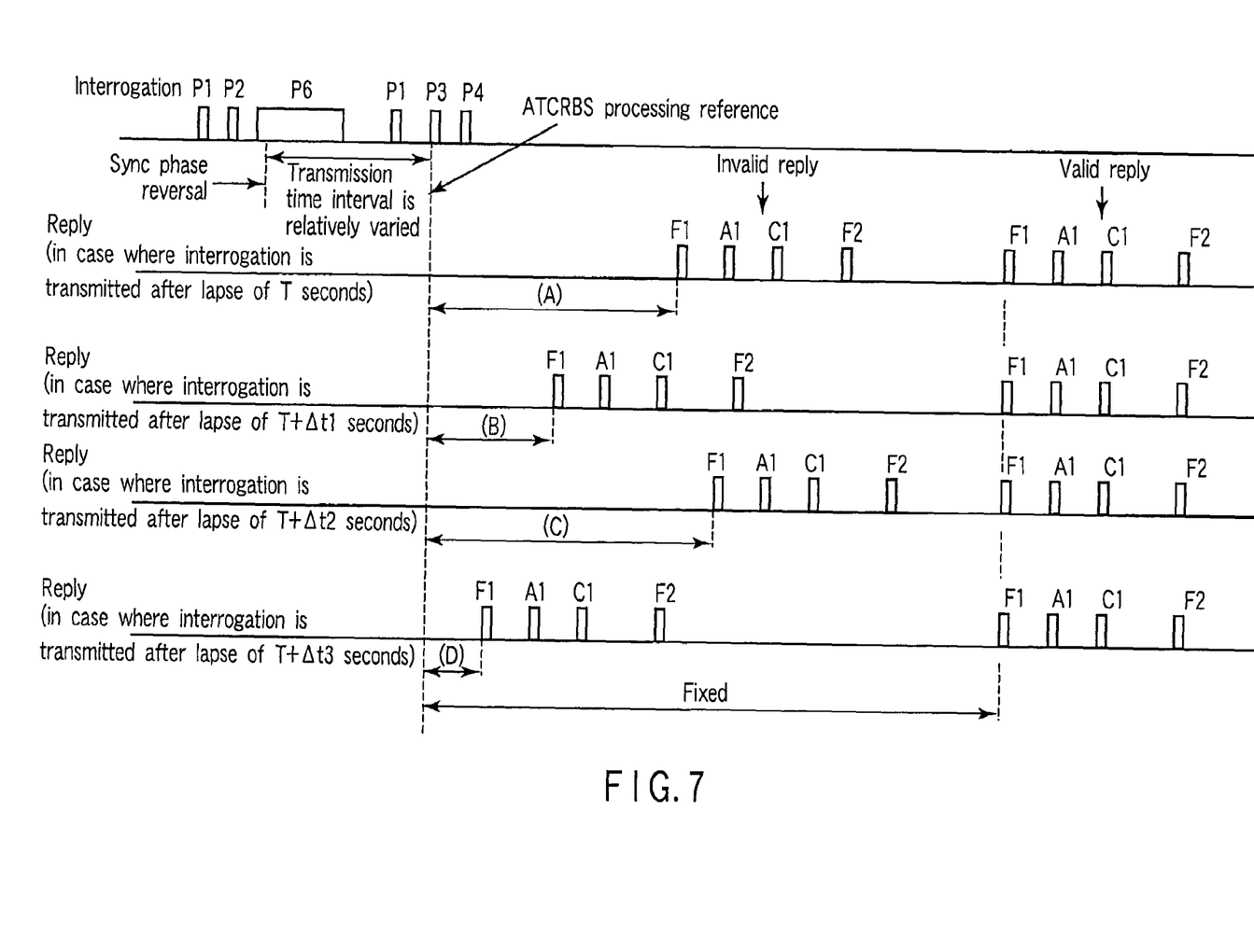
FIG. 7 is a timing chart schematically showing the operation of the above embodiment.

FIG. 7 is a timing chart schematically showing the operation of the above embodiment. In the embodiment, the time interval between the sync phase reversal of the pulse P6 and the pulse P3 randomly varies in units of one all-call time period. Thus, reply signals to interrogation signals are returned at random timings indicated by (A), (B), (C) and (D) in FIG. 7. This means that reply signals from an aircraft are returned at different timings (ranges) with respect to an ATCRBS processing reference. Also, this means that the position of the aircraft discontinuously varies at intervals of all-call time periods. It is not reasonable that the position of the aircraft discontinuously varies at intervals of all-call time periods. Based on this, invalid responses can be reliably recognized as invalid responses.

On the other hand, valid responses are returned at a constant timing (range) with respect to the ATCRBS processing reference. This is reasonable. This is because each of all-call time periods is several milliseconds, and the distance over by which an aircraft moves for several milliseconds can be ignored. Based on this, valid responses can be reliably acquired.

In such a manner, in the secondary surveillance radar system according to the above embodiment of the present invention, which is used in surveillance of an airspace, and which can reliably achieve surveillance even when aircrafts respectively including a mode S transponder and an ATCRBS transponder are located in the airspace under surveillance, the time interval between the mode S processing reference point (sync phase reversal) of the all-call interrogation signal for mode S and the pulse P3 of the all-call interrogation signal for mode A is varied in units of one all-call time period. Similarly, the time interval between the mode S processing reference point (sync phase reversal) of the all-call interrogation signal for mode S and the pulse P3 of the all-call interrogation signal for mode C is varied in units of one all-call time period. By virtue of the above feature, when invalid reply signals are generated from an aircraft, they are returned at randomly different timings. That is, they indicate randomly different values with respect to the distance between the aircraft and the ground equipment. Thus, they can be recognized as invalid signals. Accordingly, when invalid reply signals which indicate randomly different values of slant range are acquired, they can be eliminated as invalid signals with calculation processing.

By virtue of the above features, according to the embodiment of the present invention, invalid responses of an ATCRBS transponder to all-calls specific for mode S can be reliably recognized as invalid responses, and be then eliminated. Accordingly, the invention contributes to an aircraft safety.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A secondary surveillance radar system for use in surveillance of an airspace, which reliably achieves surveillance of the airspace even when an aircraft including a mode S transponder and an aircraft including an ATCRBS transponder are both located in the airspace, wherein both of a time interval between time when transmission of an all-call interrogation signal specific for mode S is completed and time when the transmission of an all-call interrogation signal specific for mode A is started and a time interval between time when transmission of the all-call interrogation signal specific for mode S is completed and time when transmission of an all-call interrogation signal specific for mode C is started is varied in units of one all-call time period.

2. The secondary surveillance radar system according to claim 1, wherein each of the time intervals is longer than a dead time of the ATCRBS transponder.

3. A secondary surveillance radar system for use in surveillance of an airspace, which reliably achieves surveillance of the airspace even when an aircraft including a mode S transponder and an aircraft including an ATCRBS transponder are both located in the airspace, wherein both of a time interval between a sync phase reversal of an all-call interrogation signal specific for mode S and a pulse P3 of an all-call interrogation signal specific for mode A and a time interval between the sync phase reversal of the all-call interrogation signal specific for mode S and a pulse P3 of an all-call interrogation signal specific for mode C is varied in units of one all-call time period.

4. The secondary surveillance radar system according to claim 3, wherein each of the time intervals is longer than a dead time of the ATCRBS transponder.

5. A secondary surveillance radar system including a ground equipment which reliably surveils an airspace under surveillance, even when an aircraft including a mode S transponder and an aircraft including an ATCRBS transponder are both located in the airspace,
wherein the ground equipment comprising:
a transmitter configured to transmit a interrogation signal to the airspace;
a receiver configured to receive a reply signal to the interrogation signal transmitted by the transmitter;
a correlation processor configured to specify a mode S reply signal transmitted from the aircraft including the mode S transponder based on correlations between mode S reply signals of reply signals each of which is received by the receiver and all-call interrogation signals each of which is transmitted each time one sweep is carried out; and
a determination processor configured to determine whether each of mode S reply signals respectively specified as mode S reply signals transmitted from a plurality of aircrafts is valid or invalid, based on a variance between a plurality of range data each obtained in units of one sweep with respect to an associated one of the plurality of aircrafts,
wherein in units of one all-call time period, the transmitter varies both of a time interval between time when transmission of an all-call interrogation signal specific for mode S is completed and time when transmission of an all-call interrogation signal specific for mode A is started and a time interval between time when the transmission of the all-call interrogation signal specific for mode S is completed and time when transmission of an all-call interrogation signal specific for mode C is started.

6. The secondary surveillance radar system according to claim 5, wherein each of the time intervals is longer than a dead time of the ATCRBS transponder.

7. A secondary surveillance radar system including a ground equipment which reliably surveils an airspace under surveillance, even when an aircraft including a mode S transponder and an aircraft including an ATCRBS transponder are both located in the airspace,
wherein the ground equipment comprising:
a transmitter configured to transmit a interrogation signal to the airspace;
a receiver configured to receive a reply signal to the interrogation signal transmitted by the transmitter;
a correlation processor configured to specify a mode S reply signal transmitted from the aircraft including the mode S transponder based on correlations between mode S reply signals of reply signals each of which is received by the receiver and all-call interrogation signals each of which is transmitted each time one sweep is carried out; and
a determination processor configured to determine whether each of mode S reply signals respectively specified as mode S reply signals transmitted from a plurality of aircrafts is valid or invalid, based on a variance between a plurality of range data each obtained in units of one sweep with respect to an associated one of the plurality of aircrafts,
wherein in units of one all-call time period, the transmitter varies both of a time interval between a sync phase reversal of an all-call interrogation signal specific for mode S and a pulse P3 of an all-call interrogation signal specific for mode A and a time interval between the sync phase reversal of the all-call interrogation signal specific for mode S and a pulse P3 in an all-call interrogation signal specific for mode C.

8. The secondary surveillance radar system according to claim 7, wherein each of the time intervals is longer than a dead time of the ATCRBS transponder.

9. A ground equipment for use in a secondary surveillance radar system, which reliably surveils an airspace under surveillance even when an aircraft including a mode S transponder and an aircraft including an ATCRBS transponder are located in the airspace, the ground equipment comprising:
a transmitter configured to transmit a interrogation signal to the airspace;
a receiver configured to receive a reply signal to the interrogation signal transmitted by the transmitter;
a correlation processor configured to specify an ATCRBS reply signal transmitted from the aircraft including the ATCRBS transponder based on correlations between ATCRBS reply signals of reply signals each of which is received by the receiver and all-call interrogation signals for mode A or mode C each of which is transmitted each time one sweep is carried out; and
a determination processor configured to determine whether each of ATCRBS reply signals respectively specified as ATCRBS reply signals transmitted from a plurality of aircrafts is valid or invalid, based on a variance between a plurality of range data each obtained in units of one sweep with respect to an associated one of the plurality of aircrafts,
wherein in units of one all-call time period, the transmitter varies both of a time interval between time when transmission of an all-call interrogation signal specific for mode S is completed and time when transmission of an all-call interrogation signal specific for mode A is started and a time interval between the transmission of the all-call interrogation signal specific for mode S is completed and time when transmission of an all-call interrogation signal specific for mode C is started.

10. The ground equipment according to claim 9, wherein each of the time intervals is longer than a dead time of the ATCRBS transponder.

11. A ground equipment for use in a secondary surveillance radar system, which reliably surveils an airspace under surveillance even when an aircraft including a mode S transponder and an aircraft including an ATCRBS transponder are both located in the airspace, the ground equipment comprising:
a transmitter configured to transmit a interrogation signal to the airspace;

a receiver configured to receive a reply signal to the interrogation signal transmitted by the transmitter;

a correlation processor configured to specify an ATCRBS reply signal transmitted from the aircraft including the ATCRBS transponder based on correlations between ATCRBS reply signals of reply signals each of which is received by the receiver and all-call interrogation signals for mode A or mode C each of which is transmitted each time one sweep is carried out; and a determination processor configured to determine whether each of ATCRBS reply signals respectively specified as ATCRBS reply signals transmitted from a plurality of aircrafts is valid or invalid, based on a variance between a plurality of range data each obtained in units of one sweep with respect to an associated one of the plurality of aircrafts, wherein in units of one all-call time period, the transmitter varies both of a time interval between a sync phase reversal of an all-call interrogation signal specific for mode S and a pulse P3 in an all-call interrogation signal specific for mode A and a time interval between the sync phase reversal of the all-call interrogation signal specific for mode S and a pulse P3 of an all-call interrogation signal specific for mode C.

12. The ground equipment according to claim 11, wherein each of the time intervals is longer than a dead time of the ATCRBS transponder.

13. A reply-signal checking method for checking validity of a reply signal to a interrogation signal in an airspace under surveillance, which enables the airspace to be reliably surveilled even when an aircraft including a mode S transponder and an aircraft including an ATCRBS transponder are both located in the airspace, the reply-signal checking method comprising:

transmitting a interrogation signal to the airspace;

receiving a reply signal to the transmitted interrogation signal;

specifying an ATCRBS reply signal transmitted from the aircraft including the ATCRBS transponder based on correlations between ATCRBS reply signals of received reply signals and all-call interrogation signals for mode A or mode C each of which is transmitted each time one sweep is carried out; and determining whether each of ATCRBS reply signals respectively specified as ATCRBS reply signals transmitted from a plurality of aircrafts is valid or invalid, based on a variance between a plurality of range data each obtained in units of one sweep with respect to an associated one of the plurality of aircrafts, wherein the transmitting the interrogation signal including varying, in units of one all-call time period, both of a time interval between time when transmission of an all-call interrogation signal specific for mode S is completed and time when transmission of an all-call interrogation signal specific for mode A is started and a time interval between the transmission of the all-call interrogation signal specific for mode S is completed and time when transmission of an all-call interrogation signal specific for mode C is started.

14. The reply-signal checking method according to claim 13, wherein the transmitting the interrogation signal makes each of the time intervals longer than a dead time of the ATCRBS transponder.

15. A reply-signal checking method for checking validity of a reply signal to a interrogation signal in an airspace under surveillance, in which enables the airspace to be reliably surveilled even when an aircraft including a mode S transponder and an aircraft including an ATCRBS transponder are both located in the airspace, the reply-signal checking method comprising:

transmitting a interrogation signal to the airspace;

receiving a reply signal to the transmitted interrogation signal;

specifying an ATCRBS reply signal transmitted from the aircraft including the ATCRBS transponder based on correlations between ATCRBS reply signals of received reply signals and all-call interrogation signals for mode A or mode C each of which is transmitted each time one sweep is carried out; and determining whether each of ATCRBS reply signals respectively specified as ATCRBS reply signals transmitted from a plurality of aircrafts is valid or invalid, based on a variance between a plurality of range data each obtained in units of one sweep with respect to an associated one of the plurality of aircrafts, wherein the transmitting the interrogation signal including varying, in units of one all-call time period, both of a time interval between a sync phase reversal of an all-call interrogation signal specific for mode S and time when a pulse P3 of an all-call interrogation signal specific for mode A and a time interval between the sync phase reversal of the all-call interrogation signal specific for mode S and a pulse P3 of an all-call interrogation signal specific for mode C.

16. The reply-signal checking method according to claim 15, wherein the transmitting the interrogation signal makes each of the time intervals longer than a dead time of the ATCRBS transponder.

* * * * *